(12) United States Patent
Papendick et al.

(10) Patent No.: US 8,747,952 B2
(45) Date of Patent: Jun. 10, 2014

(54) MATERIALS AND PROCESSES FOR COATING SUBSTRATES HAVING HETEROGENEOUS SURFACE PROPERTIES

(75) Inventors: Wolfgang Papendick, Hamburg (DE); Ottmar Schramm, Drangstedt (DE); Dominik M Raps, Munich (DE)

(73) Assignee: Airbus Operations GmbH, Hamburg (DE)

( * ) Notice: Subject to any disclaimer, the term of this patent is extended or adjusted under 35 U.S.C. 154(b) by 1296 days.

(21) Appl. No.: 12/016,636

(22) Filed: Jan. 18, 2008

(65) Prior Publication Data

US 2008/0213598 A1 Sep. 4, 2008

Related U.S. Application Data

(60) Provisional application No. 60/885,646, filed on Jan. 19, 2007.

(51) Int. Cl.
*B05D 7/14* (2006.01)
*C23C 22/83* (2006.01)

(52) U.S. Cl.
USPC ........... 427/386; 427/299; 427/327; 427/328; 427/384; 427/385.5; 427/387; 427/388.1; 427/388.2; 427/397.7; 427/540; 428/418; 428/446; 428/447; 428/450; 524/588

(58) Field of Classification Search
USPC .............. 427/299, 327, 328, 384, 385.5, 386, 427/387, 388.1, 388.2, 397.7, 540; 428/418, 446, 447, 450; 524/588
See application file for complete search history.

(56) References Cited

U.S. PATENT DOCUMENTS

| | | | |
|---|---|---|---|
| 4,581,441 A | | 4/1986 | Kleiner et al. |
| 5,057,551 A | | 10/1991 | Gonzalez et al. |
| 5,147,730 A | * | 9/1992 | Ogishi et al. ............... 428/623 |
| 5,175,027 A | | 12/1992 | Holmes-Farley et al. |
| 5,206,285 A | | 4/1993 | Castellucci |
| 5,866,652 A | | 2/1999 | Hager et al. |
| 5,874,009 A | * | 2/1999 | Inada et al. ................. 216/20 |
| 5,939,197 A | | 8/1999 | Blohowiak et al. |
| 5,958,578 A | | 9/1999 | Blohowiak et al. |
| 6,037,060 A | | 3/2000 | Blohowiak et al. |
| 2001/0032568 A1 | * | 10/2001 | Schutt ....................... 106/287.11 |
| 2002/0018900 A1 | * | 2/2002 | Kron et al. .................... 428/447 |
| 2003/0024432 A1 | | 2/2003 | Chung et al. |
| 2004/0099845 A1 | | 5/2004 | Simendinger, III et al. |
| 2007/0104968 A1 | * | 5/2007 | Jin et al. ....................... 428/447 |

FOREIGN PATENT DOCUMENTS

| | | | |
|---|---|---|---|
| DE | 3828098 | * | 3/1990 |
| DE | 4338361 | | 5/1995 |
| DE | 4303570 | | 8/1995 |
| DE | 19813709 | | 9/1999 |
| DE | 19857316 | | 6/2000 |
| DE | 19952040 | | 5/2001 |
| DE | 69621941 T2 | | 1/2003 |
| DE | 10320765 | | 11/2004 |
| EP | 0358338 | | 8/1989 |
| EP | 0610831 | | 2/1994 |
| EP | 1493843 | | 1/2005 |
| WO | 9513326 | | 5/1995 |

OTHER PUBLICATIONS

Nazarov, Journal of the Electrochemical Society, 152 (7) B220-B227 (2005).*
Boyle et al., Epoxy Resins, ASM Handbook/extraction, FB MVU, Werkstofftechnologien/Kunststofftechnik, Oct. 2003.
Dow Epoxy Brochure, Liquid Epoxy Resins, available at http://epoxy.dow.com/epoxy/products/prod/liquid.htm.
Araldite, Huntsman Advanced Materials Resins, available at www.huntsman.com/advanced_materials.

* cited by examiner

*Primary Examiner* — Robert C Boyle
(74) *Attorney, Agent, or Firm* — Roylance, Abrams, Berdo & Goodman, L.L.P.

(57) ABSTRACT

A coating material includes:
(A) a compound of formula (I)

$$R^a{}_{4-n}SiX^a{}_n \qquad (I),$$

wherein:
$X^a$ is a hydrolysable radical;
$R^a$ is a non-hydrolysable radical;
n is 2, 3 or 4;
(B) a compound of formula (II)

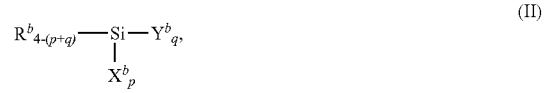

wherein:
$X^b$ is a hydrolysable radical;
$R^b$ is a non-hydrolysable radical without an epoxide function, an acryloxy function, a methacryloxy function and an isocyanate function;
$Y^b$ is a non-hydrolysable radical with a crosslinkable function; p is 2 or 3; q is 1 or 2; the sum of p and q is less than or equal to 4;
(C) a crosslinking agent;
(D) an organozirconium, organotitanium or organoaluminum compound containing hydrolysable organic radicals;
(E) a hydrolysis catalyst;
(F) crosslinkable prepolymers of epoxy and epoxysiloxane resins,
(G) optional corrosion inhibitors;
(H) optional compounds for reducing the reactivity of component (D);
wherein n and the sum of p +q are not at the same time each 4.

43 Claims, No Drawings

MATERIALS AND PROCESSES FOR COATING SUBSTRATES HAVING HETEROGENEOUS SURFACE PROPERTIES

This application claims the benefit of U.S. provisional application Ser. No. 60/885,646, filed Jan. 19, 2007.

FIELD OF THE INVENTION

The present invention relates according to a first aspect to coating materials which can be produced using specific components and to multicomponent systems for producing a coating. The invention relates additionally to specific processes for producing a coating on a substrate, using coating materials according to the invention, and to corresponding coated substrates themselves. Particularly preferred is the use of the present invention for coating aircraft structures, especially assembled structural components having at least one rivet (or another corresponding connecting element). Further preferred fields of application of the present invention relate to substrates comprising (like the structural components which have rivets and are used in aircraft construction) adjacent components or elements having heterogeneous (spatially non-uniform) surface properties.

A further field of application is protection from bimetallic corrosion in CFRP/aluminum composites.

The invention will be described hereinafter, in particular, with regard to aircraft construction and the structural components which are used therein and have connecting elements (rivets). The scope of the present invention is however, as stated, very much broader and extends beyond aircraft construction.

BACKGROUND OF THE INVENTION

In aircraft construction, structural components are often connected by connecting elements (rivets), for example stringers and frames, to the sheeting. The compounds produced then take over static and dynamic loads. To date, the metallic connecting elements (rivets) conventionally used in aircraft construction have been protected by complex corrosion protection systems. The protection systems are in this case intended to prevent corrosion both to the structural components and to the connecting elements. Conventionally, the protection systems consist of two, three or four layers which are applied in a plurality of operations, for example by spraying, rolling and/or brushing or electroplating. In the past, the multilayered systems used have often comprised an oxide layer (CAA) or a conversion coating, a primer layer applied thereto and optionally a top coat disposed on the primer layer (wherein a sealing compound can also be provided between the primer layer and top coat).

Drawbacks of the protection systems conventionally used in the past include, in particular, the large number of production process steps, the extent of the solvent immission, the amounts of waste paint and/or the high weight of the coated substrates.

For financial and ecological reasons, these parameters are in need of improvement. Nevertheless, the search for alternative protection systems for aircraft structures which allow reduction of the production costs, solvent immission, the amounts of waste paint and/or weight and comprise, in addition to (assembled) structural components, at least one rivet, is, on account of the high technical requirements placed on protection systems of this type, no straightforward task.

Firstly, they have to ensure an effective barrier against a broad range of agents to which they are exposed. Examples include, in addition to water in its various states, in particular corrosion-promoting electrolytes such as, for example, NaCl solution, aggressive phosphate ester hydraulic fluids such as Skydrol and the like. A closed film formed by a protection system of this type must be an effective diffusion barrier and must be resistant to the agents acting thereon.

Secondly, the adhesion of the protection system to the substrate (for example, structural components having rivets) must be ensured even under mechanical loads. During aircraft maintenance, the coated structural components provided with rivets are stressed as a result of being walked on and machined. During flight, high compressive forces and tensile stresses and also marked fluctuations in temperature often place extreme mechanical loads on the components. These loads are particularly high at interfaces, where different materials having different coefficients of thermal expansion abut one another. In order to resist loads at the respective interfaces, the protection systems have to have high resilience.

A further complication is that the protection systems must adhere effectively not only to a single surface but rather to different surfaces. Connecting elements used in aircraft construction (in particular rivets) are conventionally made of aluminum, titanium or steel, whereas the structural components surrounding them are often painted.

Recent times have seen the development of alternative coating materials based on the sol-gel principle. However, to date, there has been no specific coating material (and no multicomponent system operating in accordance with the sol-gel principle for producing a coating) for aircraft structures comprising, in addition to a structural component, at least one rivet, wherein the coating adheres effectively and reliably to the adjacent different surfaces (rivet, structural component) even under operating conditions while at the same time providing effective corrosion protection.

Reference is made to the following documents (and in some cases brief information is given regarding features that are of relevance in the present invention, but not disclosed in the respective document):

US 2003/0024432 A1 relating to "Corrosion inhibiting sol-gel coatings for metal alloys".

U.S. Pat. No. 5,175,027 relating to "Ultra-thin, uniform sol-gel coatings".

U.S. Pat. No. 5,206,285 relating to "Aqueous coating of silane precursor from epoxy and amino trialkoxysilanes".

U.S. Pat. No. 5,939,197 A relating to a "Sol-gel coated metal".

U.S. Pat. No. 5,958,578 A relating to a "Hybrid laminate having improved metal-to-resin adhesion".

U.S. Pat. No. 5,866,652 A relating to "Chromate-free protective coatings".

U.S. Pat. No. 6,037,060 relating to a "Sol for bonding epoxies to aluminum or titanium alloys".

DE 198 13 709 A1 relating to a "Process for protecting a metallic substrate from corrosion".

DE 43 38 361 A1 (corresponding to EP 0 728 164 B1) relating to a "Process for producing compositions based on epoxide group-containing silanes".

DE 43 03 570 A1 (EP 0 610 831 B1) relating to a "Coating material and process for producing functional coatings", but not disclosing prepolymers having an epoxy equivalent weight of at least 200.

DE 696 21 941 T2 relating to "Non-chromate corrosion inhibitors for aluminum alloys".

EP 0 358 338 B1 relating to a "Method and composition for surface treatment".

EP 1 493 843 A1 relating to a "Coated metallic component". (Corresponding to WO 2005/003407 A1).

DE 199 52 040 A1 relating to "Substrate with an abrasion-resistant diffusion blocking layer system", but containing no disclosure regarding the epoxy equivalent weight.

US 2004/0099845 A1 relating to an "Anti-corrosion composition", but not disclosing mol percentages of components of the respective compositions.

DE 198 57 316 A1 relating to "Powder coated substrates having a top paint based on silanes containing epoxide groups", but not disclosing mol percentages of all components of the respective paint.

DE 103 20 765 A1 relating to an "Agent for coating metals for corrosion protection", but not disclosing mol percentages or epoxy equivalent weights.

None of the aforementioned documents discloses a coating material or multicomponent system based on the sol-gel principle for producing a coating, which material or system ensures, after application to an aircraft structural component having at least one rivet, at the same time high resilience, a good barrier effect and effective adhesion to different materials.

DETAILED DESCRIPTION OF THE INVENTION

The primary object of the present invention was to disclose a corresponding sol-gel coating material or a corresponding multicomponent system for producing a coating.

According to the invention, the object set is achieved, with regard to the aspects of the coating material and multicomponent system, by a (sol-gel) coating material which can be produced using the following components (i.e. by the chemical reaction thereof) or multicomponent system for producing a coating, comprising or consisting of the following components:

(A) from 15-50 mol % of one or more silicon-organic compounds of formula (I)

wherein:
each $X^a$ is independently of each other $X^a$ a hydrolysable radical;
each $R^a$ is independently of each other $R^a$ a non-hydrolysable radical;
n is 2, 3 or 4;
(N.B.: component (A) includes merely compounds which cannot be interpreted as a constituent of component (B); if there is provided a compound of formula (I) which is at the same time also a compound of formula (II), this is counted as component (B).)

(B) from 30-70 mol % of one or more silicon-organic compounds of formula (II)

wherein:
each $X^b$ is independently of each other $X^b$ a hydrolysable radical;
$R^b$ is a non-hydrolysable radical without an epoxide function, without an acryloxy function, without a methacryloxy function and without an isocyanate function;
each $Y^b$ is independently of each other $Y^b$ a non-hydrolysable radical with a crosslinkable function selected from the group consisting of epoxide, acryloxy, methacryloxy and isocyanate;

p is 2 or 3;
q is 1 or 2;
the sum of p and q is less than or equal to 4;

(C) from 2-25 mol % of one or more crosslinking agents for the crosslinkable function of the radical $Y^b$;
(N.B.: component (C) includes merely those crosslinking agents which cannot be interpreted as a constituent of component (F) or another component.)

(D) from 0-40 mol % of one or more organozirconium, organotitanium or organoaluminum compounds containing hydrolysable organic radicals, for forming covalent bridges between silicon atoms and metal atoms of a metallic substrate;

(E) preferably one or more hydrolysis catalysts;

(F) one or more crosslinkable prepolymers selected from the group consisting of epoxy resins and epoxysiloxane resins and mixtures thereof,
wherein the, or one, several or all of the prepolymers have an epoxy equivalent weight of at least 200,
wherein the content of optionally present prepolymers having an epoxy equivalent weight of less than 200 is at most 5% by weight, based on the total weight of components (A), (B), (C) and (D),
wherein the content of optionally present prepolymers having an epoxy equivalent weight of less than 200 is not greater than the content of prepolymers having an epoxy equivalent weight of at least 200;
(N.B.: component (F) can also comprise prepolymers which can crosslink the crosslinkable function of the non-hydrolysable radical $Y^b$ of a compound of formula (II))

and optionally
(G) one or more corrosion inhibitors selected from the group consisting of inorganic and organic corrosion inhibitors;

and optionally
(H) one or more compounds for reducing the reactivity of component (D);

wherein the mol percentages relate to the total quantity of components (A), (B), (C) and (D),
on the condition that n and the sum of p+q are not at the same time each 4.

The term "crosslinkable" refers to the capacity to contribute to the formation of a covalent network in a manner not based on the formation of Si—O—Si bonds.

The term "hardening" as used hereinafter refers to the formation of a covalent network and includes a plurality of processes: the formation of Si—O—Si bonds and also all processes contributing to the formation of a covalent network in a manner not based on the formation of Si—O—Si bonds.

Components (A) to (H) will be described hereinafter in greater detail.

(A) Silicon-organic Compound of Formula (I)

The silicon-organic compounds of formula (I) contribute in the coating materials or multicomponent systems according to the invention to the formation of the Si—O network by hydrolysis and condensation and may contain 2, 3 or 4, preferably 2 or 3 and particularly preferably 3 hydrolysable radicals $X^a$. The compounds of formula (I) optionally also contain, depending on the number of hydrolysable radicals $X^a$, non-hydrolysable radicals $R^a$.

Preferred are coating materials or multicomponent systems according to the invention for which, in the or a compound of formula (I) of component (A):

$X^a$ is selected from the group consisting of F, Cl, Br, I, OH, alkoxy, aryloxy, acyloxy, alkylcarbonyl and alkoxycarbonyl; and/or $R^a$ is selected from the group consisting of alkyl, alkenyl, alkinyl, aryl, arylalkyl, alkylaryl, arylalkenyl, alkenylaryl, arylalkinyl, alkinylaryl and alkylalkenyl;

wherein for $R^a$, an H is optionally replaced by a substituent.

Particularly preferred are coating materials or multicomponent systems for which, in the or a compound of formula (I) of component (A):

$X^a$ is selected from the group consisting of Cl, Br, OH, alkoxy containing 1 to 22 carbon atoms, aryloxy containing 6 to 10 carbon atoms, acyloxy containing 1 to 22 carbon atoms and alkylcarbonyl containing 2 carbon atoms; and/or $R^a$ is selected from the group consisting of alkyl containing 1 to 20 carbon atoms, alkenyl containing 2 to 20 carbon atoms, alkinyl containing 2 to 4 carbon atoms; aryl containing 6 to 10 carbon atoms; alkylaryl containing 7 to 28 carbon atoms, alkylalkenyl containing 3 to 22 carbon atoms and alkenylaryl containing 8 to 28 carbon atoms;

wherein for $R^a$, an H is optionally replaced by a substituent.

Preferably, the substituent which is optionally present on the radical $R^a$ is selected from the group consisting of halogen and alkoxy.

Examples of preferred compounds of formula (I) include tetraethylorthosilicate, methyltriethoxysilane, phenyltrimethoxysilane, phenyltriethoxysilane, dimethyldimethoxysilane, propyltriethoxysilane, n-propyltrimethoxysilane, n-butyltrimethoxysilane, isobutyltrimethoxysilane, n-hexyltrimethoxysilane, n-octyltrimethoxysilane, isooctyltrimethoxysilane, n-octadecyltrimethoxysilane, cyclohexylmethyldimethoxysilane, vinyltriethoxysilane, vinylethyldichlorosilane, vinylmethyldiethoxysilane and vinyltriacetoxysilane.

In order to set the resilience (flexibility) of the coating (of the hardened coating material according to the invention), the presence of non-crosslinkable radicals $R^a$ is preferred.

Most particularly preferred are coating materials or multicomponent systems in which, in the or a compound of formula (I) of component (A), n=2 or 3 and $R^a$ is a non-crosslinkable radical.

Particularly preferred are coating materials or multicomponent systems for which, in the or a compound of formula (I) of component (A):

$X^a$ is methoxy or ethoxy, preferably methoxy;

$R^a$ is selected from the group consisting of methyl, ethyl, propyl, hexadecyl, (cyclohexyl)methyl, (n-octadecyl), isooctyl, dicyclopentyl and phenyl; and n=2 or 3.

Most preferred are coating materials or multicomponent systems according to the invention containing as the or a compound of formula (I) of component (A) phenyltrimethoxysilane (particularly preferred), isooctyltrimethoxysilane, n-octadecyltrimethoxysilane or cyclohexylmethyldimethoxysilane.

Component (A) is preferably used in a quantity of from 15-50 mol %, preferably from 20-40 mol %, based on the total quantity of components (A), (B), (C) and (D).

(B) Silicon-organic Compound of Formula (II)

The silicon-organic compounds of formula (II) also contribute in the coating materials or multicomponent systems according to the invention to the formation of covalent bonds. On the one hand, this is carried out by hydrolysis and condensation and thus by formation of the Si—O network. For this purpose, the compounds of formula (II) contain 2 or 3, preferably 3 hydrolysable radicals $X^b$. On the other hand, covalent bonds are formed by means of the crosslinkable functions of the non-hydrolysable radicals $Y^b$. This increases the network density and strengthens the diffusion barrier and the scratch resistance of the layer. The compounds of formula (II) comprise 1 or 2, preferably 1 non-hydrolysable radicals $Y^b$ with a crosslinkable function selected from the group consisting of epoxide, acryloxy, methacryloxy and isocyanate. Depending on the number of radicals $X^b$ and $Y^b$, the compounds of formula (II) optionally also contain non-hydrolysable radicals $R^b$ without an epoxide function, without an acryloxy function, without a methacryloxy function and without an isocyanate function.

Preferred are coating materials or multicomponent systems according to the invention for which, in the or a compound of formula (II) of component (B):

$X^b$ is selected from the group consisting of F, Cl, Br, I, OH, alkoxy, aryloxy, acyloxy, alkylcarbonyl and alkoxycarbonyl; and/or $R^b$ is selected from the group consisting of alkyl, alkenyl, alkinyl, aryl, arylalkyl, alkylaryl, arylalkenyl, alkenylaryl, arylalkinyl, alkinylaryl and alkylalkenyl;

wherein for $R^b$, an H is optionally replaced by a substituent.

Particularly preferred are coating materials or multicomponent systems for which, in the or a compound of formula (II) of component (B):

$X^b$ is selected from the group consisting of Cl, Br, OH, alkoxy containing 1 to 22 carbon atoms, aryloxy containing 6 to 10 carbon atoms, acyloxy containing 1 to 22 carbon atoms and alkylcarbonyl containing 2 carbon atoms; and/or $R^b$ is selected from the group consisting of alkyl containing 1 to 20 carbon atoms, alkenyl containing 2 to 20 carbon atoms, alkinyl containing 2 to 4 carbon atoms; aryl containing 6 to 10 carbon atoms; alkylaryl containing 7 to 28 carbon atoms, alkylalkenyl containing 3 to 22 carbon atoms and alkenylaryl containing 8 to 28 carbon atoms;

wherein for $R^b$, an H is optionally replaced by a substituent.

Preferred is the substituent which is optionally present on the radical $R^b$ selected from the group consisting of halogen and alkoxy.

Examples of preferred compounds of formula (II) include glycidyloxypropyltrimethoxysilane, methacryloxypropyltrimethoxysilane, methacryloxypropenyltrimethoxysilane, 3-isocyanatopropyltrimethoxysilane, BIS[2-(3,4-epoxycyclohexyl)ethyl]tetramethyledisiloxane, 1,3-BIS(glycidoxypropyl)tetramethyledisiloxane, 2-(3,4-epoxycyclohexyl)ethyltriethoxysilane, 2-(3,4-epoxycyclohexyl)ethyltrimethoxysilane.

Preferred are coating materials or multicomponent systems according to the invention in which, in the or a compound of formula (II) of component (B), $Y^b$ contains a glycidyl or glycidyloxy group.

Preferably, for the or a compound of formula (II) of component (B) in the coating materials or multicomponent systems according to the invention: $X^b$ is methoxy or ethoxy, preferably methoxy; $Y^b$ is 3-glycidyloxypropyl; p is 3; and q is 1.

Component (B) is preferably used in a quantity of from 30-70 mol %, preferably from 40-50 mol %, based on the total quantity of components (A), (B), (C) and (D).

(C) Crosslinking Agents for the Crosslinkable Function of the Radical $Y^b$

In order to ensure the crosslinking of the crosslinkable function of the radical $Y^b$ of the compound of formula (II), from 2-25 mol %, preferably 2-20 mol %, based on the total quantity of components (A), (B), (C) and (D), of one or more crosslinking agents are used in the coating materials or multicomponent systems according to the invention.

The crosslinking agent in the coating materials or multicomponent systems according to the invention is preferably in the form of Lewis bases. If the crosslinkable function of the radical $Y^b$ of the compound of formula (II) is epoxide, amines are preferred as the crosslinking agent; if the crosslinkable function is isocyanate, alcohols are preferred as the crosslinking agent. Alcohols are preferred, in particular, for the crosslinking of isocyanates; an addition of, for example, 1,4-diazabicyclo[2.2.2]octane, N,N-dimethylaminoethanol, N,N-dimethylcyclohexylamine or N,N-dimethylcetylamine in catalytic quantities accelerates the reaction. Acryloxy or methacryloxy are alternatively crosslinked, for example, using radical starters, for example using 2,2-azobis(2-methylbutyronitrile) during thermal curing or using a UV initiator (for example, an alpha-hydroxyketone such as 1-hydroxycyclohexylphenylketone) during UV curing.

The crosslinking agent used in the coating materials or multicomponent systems according to the invention is preferably (and depending on the functional radicals $Y^b$ of the compound of formula (II)) in the form of: aromatic polyols, aromatic diols, nitrogen-containing heterocycles, phenols containing one or more non-substituted amino groups, phenols containing one or more substituted amino groups, polycyclic amines, ammonia, silanes containing one or more non-substituted amino groups, silanes containing one or more substituted amino groups and mixtures thereof. Particularly preferred are bisphenol A, bisphenol S, dihydroxynaphthalene, 1-methylimidazole, 2-(N,N-dimethylaminomethyl)phenol, aminopropyltrimethoxysilane and aminopropyltriethoxysilane.

Preferred crosslinking agents for $Y^b$=isocyanate also include polyether polyols, preferably linear polyether polyols such as Desmophen 1100, Desmophen 1200, Desmophen 1800 (manufacturer in each case: Bayer)

Use is made, in the case of aromatic polyols (for example, bisphenol A, bisphenol S), typically of from 0.3 to 1.0 mol of hydroxy groups per mol of epoxy groups present in the coating material or multicomponent system and, in the case of 1-methylimidazole or 2-(N,N-dimethylaminomethyl)phenol, typically of from 0.05 to 0.5 mol of the respective compound per mol of epoxy groups.

(D) Organometal Compound

From 0-40 mol %, based on the total quantity of components (A), (B), (C) and (D), of one or more organozirconium, organotitanium or organoaluminum compounds containing hydrolysable organic radicals in the coating materials or multicomponent systems according to the invention can be used for forming covalent bridges between silicon atoms and metal atoms of a metallic substrate. In some cases, it is preferable, in the coating materials or multicomponent systems according to the invention, to dispense entirely with component (D) or to use merely small quantities thereof, for example from 0-30 mol %, 0-20 mol % or 0-15 mol %, based on the total quantity of components (A), (B), (C) and (D), in order to sacrifice hardness for improved resilience of the hardened layer. Independent tests have revealed that component (D) is not in all cases necessary for effective adhesion of the coatings. For the coating materials or multicomponent systems according to the invention, preferred compounds of component (D) include zirconium (IV) propoxide, titanium n-butoxide and aluminum sec-butoxide, wherein preferably zirconium (IV) propoxide is used.

(E) Hydrolysis Catalyst

In the coating materials or multicomponent systems according to the invention, the hydrolysis catalyst used is preferably an acid catalyst or a mixture of various acid catalysts. Preferred are HCl, $HNO_3$, $H_2SO_4$, $H_3PO_4$ and $CH_3COOH$ and mixtures thereof. Typical quantities of the water used for hydrolysis are from 0.5-1.5 mol per hydrolysable group.

(F) Prepolymer

Epoxy resins and/or epoxysiloxane resins are used as prepolymers in the coating materials or multicomponent systems according to the invention. It has been found that the presence of suitable prepolymers is crucial for achieving the object of the present invention. The prepolymers are used primarily to set high resilience of the hardened coating and can additionally influence the degree of the formation of the covalent network, hardness and barrier function of the hardened coating and also the viscosity and pot life of the not yet completely hardened coating material.

In some cases, it is preferable not to use too high contents of component (F). Preferred in such cases are coating materials or multicomponent systems in which component (F) is present in a content of at most 10% by weight, preferably at most 5% by weight, based on the total weight of components (A), (B), (C) and (D).

Critical to the success according to the invention is the presence of at least one prepolymer having an epoxy equivalent weight of at least 200. Preferred is the presence of a prepolymer having an epoxy equivalent weight of at least 230, particularly preferably of at least 260, most particularly preferably of at least 300.

If an excessively high content of prepolymers having an epoxy equivalent weight of less than 200 is present, the resulting coating material or multicomponent system for producing a coating is not able, after application to an aircraft structural component having at least one rivet, to ensure at the same time high resilience, a good barrier and effective adhesion to different materials. Therefore, the content of optionally present prepolymers having an epoxy equivalent weight of less than 200 may be at most 5% by weight, based on the total weight of components (A), (B), (C) and (D). In any case, the content of prepolymers having an epoxy equivalent weight of less than 200 may not be greater than the content of prepolymers having an epoxy equivalent weight of at least 200.

Particularly suitable prepolymers include, for example, the substances obtainable under the following commercial names: D.E.R. 337, D.E.R. 732 (manufacturer in each case: Dow epoxy resin), SILIKOPON EF (manufacturer: TEGO) and Tegomer ESi 2330 (manufacturer: TEGO).

If use is made of a polyepoxide of component (F) and a methacryloxy or isocyanate group-containing compound of component (B), regularly interpenetrating networks are formed, i.e. there is carried out, on the one hand, crosslinking of the methacryloxy or isocyanate groups and, on the other hand, network formation of the polyepoxide. Addition of amines in catalytic quantities is often advantageous.

(G) Corrosion Inhibitor

Optionally contained in the coating materials or multicomponent systems according to the invention are one or more corrosion inhibitors selected from the group consisting of inorganic and organic corrosion inhibitors. The corrosion inhibitors promote, in particular, passivation of "exposed" basic material in the event of damage to the applied sol-gel coating and are either dispersed in the finished sol or introduced as early as during the hydrolysis (see below in this regard). The content of corrosion inhibitors is preferably in the range of from 0-10% by weight, particularly preferably from 3-6% by weight, based on the total weight of components (A), (B), (C) and (D).

Preferred inorganic corrosion inhibitors in the coating materials or multicomponent systems according to the invention are those which are selected from the group consisting of vanadates, borates, phosphates, molybdates, tungstates, oxides and mixtures thereof and/or which contain at least one element selected from the group consisting of cerium, yttrium, lanthanum, titanium and zirconium. Preferably, an inorganic corrosion comprises oxidic nanoparticles selected from the group consisting of titanium oxide, zirconium oxide and cerium oxide, vanadium oxide, zinc oxide and mixtures thereof.

In the coating materials or multicomponent systems according to the invention, preferred organic corrosion inhibitors are selected from the group consisting of triazoles (in particular benzotriazole, 5-methylbenzotriazole and 2-mercaptobenzothiazole and mixtures thereof), 2-benzothiazolylhiosuccinic acid, zinc-5-nitroisophthalate and mixtures thereof.

(H) Compound for Reducing the Reactivity of Component (D)

Contained in the coating materials or multicomponent systems according to the invention are preferably compounds for reducing the activity of the organometal compound of component (D) (insofar as it is present). These compounds are preferably in the form of a chelating agent or a mixture of various chelating agents. Preferred are acetylacetone, acetoacetic ester, propionic acid and mixtures thereof. Typically, chelating agents are used in a molar ratio of 1:2 to the hydrolysable radicals of component (D).

Preferably, the coating materials or multicomponent systems according to the invention have a combination of the embodiments characterized hereinbefore as being preferable for the individual components (A) to (H).

Preferred are, in particular, coating materials or a multicomponent system comprising
    from 20 to 40 mol % of component (A),
    from 40 to 50 mol % of component (B), and/or
    from 2 to 20 mol % of component (C), and/or
    from 0 to 30 mol % of component (D),
based on the total quantity of components (A), (B), (C) and (D).

Preferred are coating materials or multicomponent systems wherein for component (A):
    $X^a$ is selected from the group consisting of F, Cl, Br, I, OH, alkoxy, aryloxy, acyloxy, alkylcarbonyl and alkoxycarbonyl;
    $R^a$ is selected from the group consisting of alkyl, alkenyl, alkinyl, aryl, arylalkyl, alkylaryl, arylalkenyl, alkenylaryl, arylalkinyl, alkinylaryl and alkylalkenyl;
wherein for component (B):
    $X^b$ is selected from the group consisting of F, Cl, Br, I, OH, alkoxy, aryloxy, acyloxy, alkylcarbonyl and alkoxycarbonyl;
    $R^b$ is selected from the group consisting of alkyl, alkenyl, alkinyl, aryl, arylalkyl, alkylaryl, arylalkenyl, alkenylaryl, arylalkinyl, alkinylaryl and alkylalkenyl;
wherein for component (C):
    the crosslinking agent or agents are Lewis bases;
wherein component (D) is selected from the group consisting of
    tetra-n-propoxyzirconium, tetra-1-propoxyzirconium, titanium n-butoxide and aluminum sec-butylate;
wherein component (E) is an acid catalyst or a mixture of various acid catalysts; and
wherein component (H) is a chelating agent or a mixture of various chelating agents.

Furthermore, the coating materials or multicomponent systems according to the invention may contain additives conventional in this field such as, for example, UV stabilizers, photoinitiators, photosensitizers, thermal polymerization catalysts, flow control agents or coloring agents.

According to a further aspect, the present invention also relates to a process for producing a coating on a substrate, including the following steps:
    providing a substrate,
    providing or producing a not completely hardened coating material as defined hereinbefore (preferably in one of the embodiments described hereinbefore as being preferable),
    hardening the coating material or allowing it to continue hardening and
    applying the coating material to the substrate, at least in certain regions, before or during the hardening.

Preferably, in a process according to the invention, the substrate is, prior to the application of the coating, chemically precleaned, physically precleaned, leached, treated with a primer, exposed to an electric discharge, exposed to an atmospheric pressure plasma process, $CO_2$-radiated, treated with an abrasive medium and/or baked.

The coating material is applied in a process according to the invention using methods known to a person skilled in the art, preferably by spraying or dipping.

The embodiments preferred for the coating materials or multicomponent systems according to the invention are also preferred for the process according to the invention.

According to a further aspect, the present invention also relates to coated substrates obtainable by a process according to the invention.

The invention relates according to a further aspect also to a process for producing a coating material as defined hereinbefore, including the following steps:
    mixing components (A), (B) and (C),
    hydrolyzing the hydrolysable groups of components (A) and (B),
    adding component (F) before, during and/or after the hydrolysis,
    crosslinking crosslinkable groups of components (B) and/or (F);
and to a coating material obtainable by this process.

In some cases, it is preferable to add component (F) after the hydrolysis. In other cases, it is preferable to add component (F) during the hydrolysis.

It is preferable to initiate or to accelerate the crosslinking by suitable measures (for example, induced cleavage of an additionally added radical starter and/or incubation at a temperature of at least 20° C.) after the hydrolysis. If use is made of a component (B) containing a radical $Y^b$, which is acryloxy or methacryloxy, a UV initiator (for example, an alpha-hydroxyketone such as 1-hydroxycyclohexylphenylketone) or a thermal radical starter such as 2,2-azobis(2-methylbutyronitrile) (VAZO67) is preferably used.

A coated substrate according to the invention is preferably an aircraft structure. It is preferable that the substrate consists of at least one connecting element or comprises at least one connecting element. The connecting element is preferably a rivet. Preferred is a connecting element comprising or consisting of one or more materials selected from the group consisting of aluminum, titanium and steel and the products of oxidation of these materials close to the surface.

Particularly preferred is a coated substrate according to the invention comprising at least one connecting element in contact with at least one further substrate body, wherein the further substrate body is painted, wherein the coating covers a joint between the connecting element and the further substrate body, and wherein the coating is applied both to the connecting element and to the paint of the further substrate body. Preferably, no further protective layer is provided in a coated substrate according to the invention.

Preferably, in the case of a coated substrate according to the invention, a plurality of embodiments characterized as being preferable are combined with one another. The embodiments preferred for the coating materials or multicomponent systems according to the invention or the process according to the invention are also preferred for the coated substrates according to the invention.

Preferred is a coated substrate according to the invention, wherein the substrate is an aircraft structure
comprising a structural part having at least one rivet consisting of one or more materials selected from the group consisting of aluminum, titanium and steel and the products of oxidation of these materials close to the surface, obtainable by a process according to the invention including providing or producing a not completely hardened (preferred) coating material according to the invention, wherein no further protective layer is provided.

Further preferred embodiments will emerge from the following examples and claims. The following examples describe the present invention in greater detail.

EXAMPLES

Example 1

Coating Material Containing an Epoxide-Functional Component (B)

| Component | Phenyl-trimethoxy-silane (A) | 3-Glycidyloxy-propyltrimethoxy-silane (B) | Amino-propyltriethoxy-silane (C) | Zirconium (IV) propoxide (D) | Acetoacetic ester (H) | $H_2O$ | D.E.R. 732 (F) |
|---|---|---|---|---|---|---|---|
| Block I | 59.5 g | 118.17 g | 22.14 g | — | — | — | — |
| Block II | — | — | — | 32.76 g | 13.0 g | — | — |
| Block III | — | — | — | — | — | 54 g | — |
| Block IV | — | — | — | — | — | — | 10 g |

To produce block I, components (A), (B) and (C) were mixed. Block I was stirred while being cooled with ice. Block II was produced by adding component (H) to component (D). Block II was slowly added dropwise to block I. Subsequently, block III ($H_2O$) was added slowly to the resulting mixture while stirring and while being cooled with ice and then stirred for 2 h. After completion of the hydrolysis, 10 g of block IV were stirred in. Specific paint properties such as, for example, wetting of the surface and homogeneous formation of layers on the substrate were set using paint additives (for example: flow control additives, for example polyether-modified polydimethylsiloxanes; defoaming agents, for example TEGO Foamex 800, a silica-containing polyethersiloxane copolymer) and solvents.

The coating material can be applied to substrates (for example, aluminum alloys) in layer thicknesses of from 3-15 μm. For crosslinking, incubation was carried out, for example, at room temperature for 24 h or at a temperature in the range of from 60° C. to 120° C. for 1 h.

Example 2

Coating Material Containing an Isocyanate-Functional Component (B)

| Component | Phenyl-trimethoxy-silane (A) | Isocyanato-propyltrimethoxy-silane (B) | Bisphenol A (C) | Zirconium (IV) propoxide (D) | Acetoacetic ester (H) | 0.1M $HNO_3$ (E) | D.E.R. 732 (F) |
|---|---|---|---|---|---|---|---|
| Block I | 59.5 g | 102.65 g | 45.66 g | — | — | — | — |
| Block II | — | — | — | 32.76 g | 13.0 g | — | — |
| Block III | — | — | — | — | — | 43.2 g | 10 g |

To produce block I, components (A), (B) and (C) were mixed. Block I was stirred while being cooled with ice. Block II was produced by adding component (H) to component (D). Block II was slowly added dropwise to block I. Subsequently, block III, which was produced by mixing component (E) with component (F), was slowly added while stirring and while being cooled with ice and then stirred for 2 h. Specific paint properties were set, as in Example 1, using paint additives and solvents.

4.62 g of Vazo67 can be added as a radical starter shortly before coating (manufacturer: DuPont).

The coating material can, in particular, be applied to substrates in layer thicknesses of from 3-15 μm (see above). For crosslinking, incubation was carried out at a temperature in the range of from 60° C. to 120° C. for 1 h.

The layers according to Examples 1 and 2 were cured preferably by heating (increase in temperature). An $SiO_2$ network was formed in this case, since water and alcohols evaporate and the previous hydrolysis-condensation equilibrium is shifted toward condensation. Without an increase in temperature, organic tin salts may be added to form the $SiO_2$ network. However, this variation of the process is not preferred owing to the toxicity of these substances.

Example 3

Impact Test

The coating material according to Example 1 was applied to a AA2024 unclad-type substrate (aluminum alloy) and cured by an increase in temperature (see above).

The resulting coating did not become detached from the substrate.

Example 4

Adhesion Test (ISO 2409)

As in Example 3, coating materials according to Example 1 were applied to an AA2024 unclad-type substrate. The applied layers were cured and subjected to an adhesion test to ISO 2049. The adhesion was found to be outstanding.

Example 5

Salt Spray Test (ASTM B117)

The coating material from Example 1 was applied to an AA2024 clad-type substrate and subjected to a salt spray test to ASTM B117 (500 h SST). It was tested whether the applied layer delaminated starting from a crack. The present coating displayed no signs of delamination.

What is claimed is:

1. A coating on an aircraft structure substrate, where said coating can be produced using the following components or multicomponent system for producing a coating, comprising the following components:
   (A) from 15-50 mol % of one or more silicon-organic compounds of formula (I)

   $$R^a{}_{4-n}SiX^a{}_n \qquad (I),$$

wherein:
   each $X^a$ is independently of each other a hydrolysable radical;
   each $R^a$ is independently of each other a non-hydrolysable radical;
   n is 2, 3 or 4;
   (B) from 30-70 mol % of one or more silicon-organic compounds of formula (II)

   $$R^b{}_{4-(p+q)}\!-\!\underset{\underset{X^b{}_p}{|}}{Si}\!-\!Y^b{}_q, \qquad (II)$$

wherein:
   each $X^b$ is independently of each other a hydrolysable radical;
   $R^b$ is a non-hydrolysable radical without an epoxide function, without an acryloxy function, without a methacryloxy function and without an isocyanate function;
   each $Y^b$ is independently of each other a non-hydrolysable radical with a crosslinkable function selected from the group consisting of epoxide, acryloxy, methacryloxy and isocyanate
   p is 2 or 3;
   q is 1 or 2;
   the sum of p and q is less than or equal to 4;
   (C) from 2-25 mol % of one or more crosslinking agents for the crosslinkable function of the radical $Y^b$;
   (D) one or more organozirconium, organotitanium or organoaluminum compounds containing hydrolysable organic radicals, for forming covalent bridges between silicon atoms and metal atoms of a metallic substrate in an amount of at most 40 mol %;
   (E) one or more hydrolysis catalysts;
   (F) one or more crosslinkable prepolymers selected from the group consisting of epoxy resins and epoxysiloxane resins and mixtures thereof in an amount of at most 10 wt % based on the total weight of components (A), (B), (C) and (D),
   wherein at least one of the prepolymers have an epoxy equivalent weight of at least 200, wherein the content of prepolymers having an epoxy equivalent weight of less than 200 is at most 5% by weight, based on the total weight of components (A), (B), (C) and (D), wherein the content of prepolymers having an epoxy equivalent weight of less than 200 is not greater than the content of prepolymers having an epoxy equivalent weight of at least 200;
   and optionally
   (G) one or more corrosion inhibitors selected from the group consisting of inorganic and organic corrosion inhibitors;
   and optionally
   (H) one or more compounds for reducing the reactivity of component (D);
   wherein the mol percentages relate to the total quantity of components (A), (B), (C) and (D), on the condition that n and the sum of p+q are not at the same time each 4.

2. The coating on an aircraft structure substrate as claimed in claim 1, wherein:
   $X^a$ and/or $X^b$ is selected from the group consisting of F, Cl, Br, I, OH, alkoxy, aryloxy, acyloxy, alkylcarbonyl and alkoxycarbonyl; and/or
   $R^a$ and/or $R^b$ is an unsubstituted or substituted group selected from the group consisting of alkyl, alkenyl, alkinyl, aryl, arylalkyl, alkylaryl, arylalkenyl, alkenylaryl, arylalkinyl, alkinylaryl and alkylalkenyl.

3. The on an aircraft structure substrate as claimed in claim 1, wherein:
   $X^a$ and/or $X^b$ is selected from the group consisting of Cl, Br, OH, alkoxy containing 1 to 22 carbon atoms, aryloxy containing 6 to 10 carbon atoms, acyloxy containing 1 to 22 carbon atoms and alkylcarbonyl containing 2 carbon atoms; and/or
   $R^a$ and/or $R^b$ is an unsubstituted or substituted group selected from the group consisting of alkyl containing 1 to 20 carbon atoms, alkenyl containing 2 to 20 carbon atoms, alkinyl containing 2 to 4 carbon atoms; aryl containing 6 to 10 carbon atoms; alkylaryl containing 7 to 28 carbon atoms, alkylalkenyl containing 3 to 22 carbon atoms and alkenylaryl containing 8 to 28 carbon atoms.

4. The coating on an aircraft structure substrate as claimed in claim 1, wherein:
   n is 2 or 3, and
   $R^a$ is a non-crosslinkable radical.

5. The coating on an aircraft structure substrate as claimed in claim 1, wherein:
   $X^a$ is methoxy or ethoxy;
   $R^a$ is selected from the group consisting of methyl, ethyl, propyl, hexadecyl, (cyclohexyl)methyl, (octadecyl)methyl, isooctyl, dicyclopentyl and phenyl;
   and
   n is 2 or 3.

6. The coating on an aircraft structure substrate as claimed in claim 1, wherein:
   $X^a$ is methoxy;
   $R^a$ is phenyl;
   and
   n is 3.

7. The coating on an aircraft structure substrate as claimed in claim 1, wherein:
   $Y^b$ contains a glycidyl or glycidyloxy group.

8. The on an aircraft structure substrate as claimed in claim 1, wherein:
$X^b$ is methoxy or ethoxy;
$Y^b$ is 3-glycidyloxypropyl;
p is 3; and
q is 1.

9. The coating on an aircraft structure substrate as claimed in claim 2,
wherein $R^a$ and/or $R^b$ comprises a substituent selected from the group consisting of halogen and alkoxy.

10. The coating on an aircraft structure substrate as claimed in claim 1, wherein for component (C):
the crosslinking agent or agents are Lewis bases.

11. The coating on an aircraft structure substrate as claimed in claim 1, wherein for component (C):
the crosslinking agent or agents are selected from the group consisting of
aromatic polyols, aromatic diols, nitrogen-containing heterocycles, phenols containing one or more non-substituted amino groups, phenols containing one or more substituted amino groups, polycyclic amines, ammonia, silanes containing one or more non-substituted amino groups, silanes containing one or more substituted amino groups and mixtures thereof.

12. The coating on an aircraft structure substrate as claimed in claim 1, wherein for component (C):
the crosslinking agent or agents are selected from the group consisting of
bisphenol A, bisphenol S, dihydroxynaphthalene, 1-methylimidazole, 2-(N,N-dimethylaminomethyl)phenol, aminopropyltrimethoxysilane, aminopropyltriethoxysilane, polyether polyols.

13. The coating on an aircraft structure substrate as claimed in claim 1, wherein component (D) is selected from the group consisting of :
zirconium (IV) propoxide, titanium n-butoxide and aluminum sec-butoxide.

14. The coating on an aircraft structure substrate as claimed in claim 1, wherein component (D) is dispensed with.

15. The coating on an aircraft structure substrate as claimed in claim 1, wherein component (E) is an acid catalyst or a mixture of various acid catalysts.

16. The coating on an aircraft structure substrate as claimed in claim 1, wherein component (E) is selected from the group consisting of
HCl, $HNO_3$, $H_2SO_4$, $H_3PO_4$ and $CH_3COOH$ and mixtures thereof.

17. The coating on an aircraft structure substrate as claimed in claim 1, wherein component (G) is an inorganic corrosion inhibitor and
is selected from the group consisting of vanadates, borates, phosphates, molybdates, tungstates, oxides and mixtures thereof;
and/or
contains at least one element selected from the group consisting of cerium, yttrium, lanthanum, titanium and zirconium.

18. The coating as claimed in claim 1, wherein component (G) is an inorganic corrosion inhibitor and comprises oxidic nanoparticles selected from the group consisting of
titanium oxide, zirconium oxide and cerium oxide, vanadium oxide, zinc oxide and mixtures thereof.

19. The coating as claimed in claim 1, wherein component (G) comprises one or more organic corrosion inhibitors selected from the group consisting of
triazoles, 2-benzothiazolythiosuccinic acid, zinc-5-nitroisophthalate and mixtures thereof.

20. The coating as claimed in claim 1, wherein component (G) comprises one or more organic corrosion inhibitors selected from the group consisting of
benzotriazole, 5-methylbenzotriazole, 2-mercaptobenzotriazole and mixtures thereof.

21. The coating on an aircraft structure substrate as claimed in claim 1, further comprising a component (H) for reducing the reactivity of component (D) and where component (H) is a chelating agent or a mixture of various chelating agents.

22. The coating on an aircraft structure substrate as claimed in claim 21, wherein component (H) is selected from the group consisting of
acetylacetone, acetoacetic ester, propionic acid and mixtures thereof.

23. The coating on an aircraft structure substrate as claimed in claim 1, comprising
from 20 to 40 mol % of component (A),
from 40 to 50 mol % of component (B), and/or
from 2 to 20 mol % of component (C), and/or
up to 30 mol % of component (D),
based on the total quantity of components (A), (B), (C) and (D).

24. The coating on an aircraft structure substrate as claimed in claim 23,
wherein for component (A):
$X^a$ is selected from the group consisting of F, Cl, Br, I, OH, alkoxy, aryloxy, acyloxy, alkylcarbonyl and alkoxycarbonyl;
$R^a$ is selected from the group consisting of alkyl, alkenyl, alkinyl, aryl, arylalkyl, alkylaryl, arylalkenyl, alkenylaryl, arylalkinyl, alkinylaryl and alkylalkenyl;
wherein for component (B):
$X^b$ is selected from the group consisting of F, Cl, Br, I, OH, alkoxy, aryloxy, acyloxy, alkylcarbonyl and alkoxycarbonyl;
$R^b$ is selected from the group consisting of alkyl, alkenyl, alkinyl, aryl, arylalkyl, alkylaryl, arylalkenyl, alkenylaryl, arylalkinyl, alkinylaryl and alkylalkenyl;
wherein for component (C):
the crosslinking agent or agents are Lewis bases;
wherein component (D) is selected from the group consisting of
tetra-n-propoxyzirconium, tetra-i-propoxyzirconium, titanium n-butoxide and aluminum sec-butylate;
wherein component (E) is an acid catalyst or a mixture of various acid catalysts; and
a component (H) being a chelating agent or a mixture of various chelating agents.

25. The coating on an aircraft structure substrate of claim 1 wherein said corrosion inhibitor is a vanadate.

26. The coating on an aircraft structure substrate of claim 1, further comprising one or more compounds for reducing the reactivity of component (D).

27. The coating on an aircraft structure substrate of claim 1, wherein said coating material contains said one or more crosslinkable prepolymers (F) in an amount of at most 5 wt % based on the total weight of components (A), (B), (C), and (D).

28. A process for producing a coating on a substrate, including the following steps:
providing a substrate,
providing or producing a not completely hardened coating material as claimed in claim 23,
hardening the coating material or allowing it to continue hardening and
applying the coating material to the substrate, at least in certain regions, before or during the hardening.

29. The process as claimed in claim 28,
wherein before the coating is applied, the substrate is chemically precleaned, physically precleaned, leached, treated with a primer, exposed to an electric discharge, exposed to an atmospheric pressure plasma process, $CO_2$-radiated, treated with an abrasive medium and/or baked.

30. The process as claimed in claim 28,
wherein the coating material is applied by spraying or dipping.

31. The process for producing a coating material as claimed in claim 1, including the following steps:
mixing components (A), (B) and (C),
hydrolyzing the hydrolysable groups of components (A) and (B),
adding component (F) before, during and/or after the hydrolysis,
crosslinking the crosslinkable groups of components (B) and (F).

32. The process as claimed in claim 31, wherein component (F) is added after the hydrolysis.

33. The process as claimed in claim 31, wherein component (F) is added during the hydrolysis.

34. The process as claimed in claim 31, wherein the crosslinking is initiated or accelerated after the hydrolysis.

35. A coating material obtainable by a process as claimed in claim 31.

36. A coated substrate obtainable by a process as claimed in claim 28.

37. The coated substrate as claimed in claim 36,
wherein the substrate is an aircraft structure.

38. The coated substrate as claimed in claim 37,
wherein the substrate consists of at least one connecting element or comprises at least one connecting element.

39. The coated substrate as claimed in claim 38,
wherein the connecting element is a rivet.

40. The coated substrate as claimed in claim 38, wherein:
the connecting element comprises or consists of one or more materials selected from the group consisting of aluminum, titanium and steel and the products of oxidation of these materials close to the surface.

41. The coated substrate as claimed in claim 38, wherein the substrate comprises at least one connecting element in contact with at least one further substrate body,
wherein the further substrate body is painted,
wherein the coating covers a joint between the connecting element and the further substrate body, and
wherein the coating is applied both to the connecting element and to the paint of the further substrate body.

42. The coated substrate as claimed in claim 36,
wherein no further protective layer is provided.

43. The coated substrate as claimed in claim 42,
wherein the substrate is an aircraft structure comprising a structural part having at least one rivet consisting of one or more materials selected from the group consisting of aluminum, titanium and steel and the products of oxidation of these materials close to the surface.

* * * * *